No. 676,570. Patented June 18, 1901.
F. A. SEIBERLING.
SOLID RUBBER VEHICLE TIRE.
(Application filed Feb. 7, 1901.)

(No Model.)

Witnesses:
W. K. Bowman.
Bessie Crook

Inventor:
Frank A. Seiberling
by Humphrey & Humphrey
Attorneys.

UNITED STATES PATENT OFFICE.

FRANK A. SEIBERLING, OF AKRON, OHIO.

SOLID-RUBBER VEHICLE-TIRE.

SPECIFICATION forming part of Letters Patent No. 676,570, dated June 18, 1901.

Application filed February 7, 1901. Serial No. 46,340. (No model.)

*To all whom it may concern:*

Be it known that I, FRANK A. SEIBERLING, a citizen of the United States, residing at Akron, in the county of Summit and State of Ohio, have invented a certain new and useful Improvement in Solid-Rubber Vehicle-Tires, of which the following is a specification.

My invention has a general relation to improvements in solid-rubber tires for vehicle-wheels supported on metallic tires surrounding the felly, channeled or flat, and has especial relation to that class of tires which rest upon a flat metallic tire and are retained by annular side plates that are secured by series of transverse bolts passing through the wood felly and the rubber tire and which tires are in some instances with endless longitudinal wires or bands having short transverse wires under them.

Some objection has been found to solid-rubber tires because of the tendency of the wheel to slide when crossing a raised obstruction, particularly railway-tracks, especially when crossing at an angle or drawing out of the tracks, and efforts have been made to overcome this objection by making the tire in short sections and retaining these sections slightly separated, so as to leave spaces between them, by metallic frames or analogous devices; but this construction is also found to be objectionable because of the wear at the joints and the tendency of the rubber to pull loose from its fastenings. Another objection is found in the fact that when the tire is compressed by a heavy load there are two results. First, the compression forces the fullness of material forward, thus presenting a movable fulcrum that offers a constant resistance to the vehicle's progress; second, as there is no place to receive the fullness the tendency of the tire is to creep in or run out of its lateral confinement.

The object of my invention is to overcome these various objections by making the tire with transverse notches in its periphery above the top edges of the lateral binding plates or flanges, thus permitting it to expand under pressure in four or more directions instead of two, from which it results that a more resilient tire is obtained.

Figure 1:
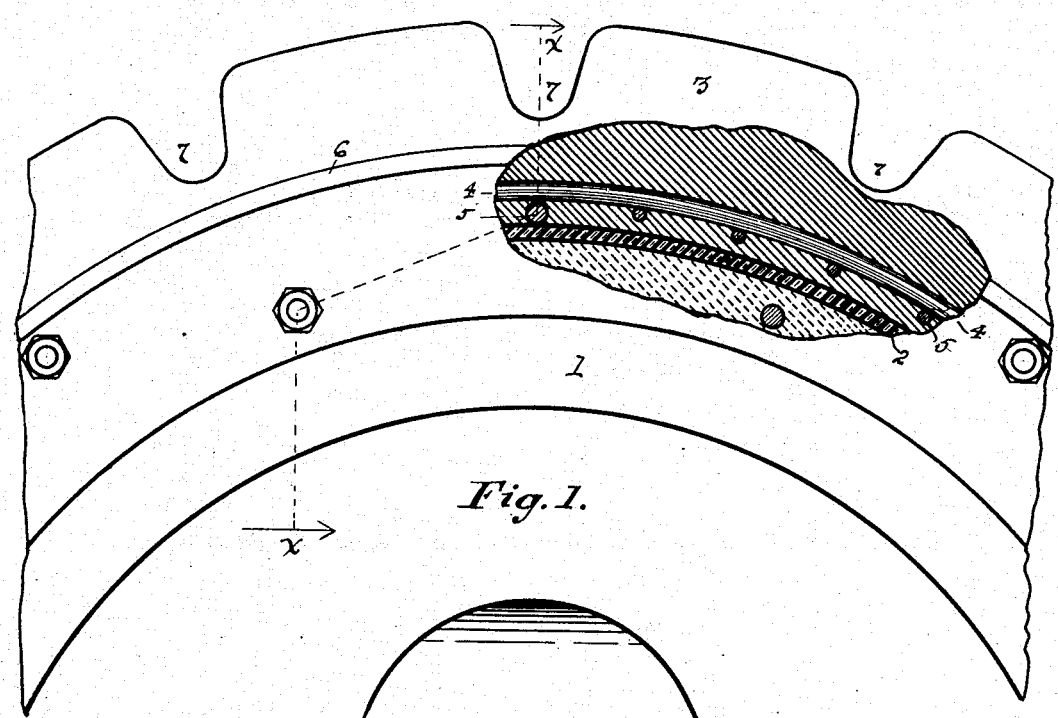
Figure 2:
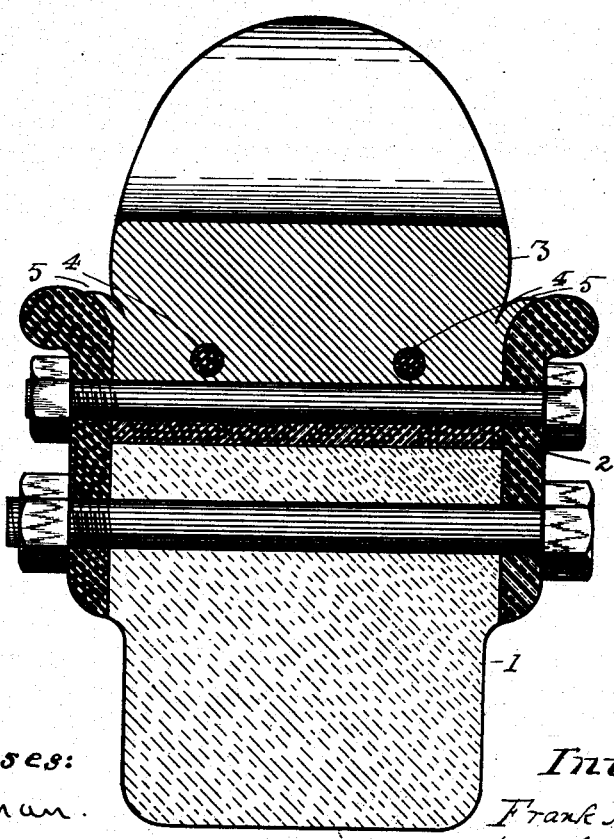

In the accompanying drawings, in which similar reference-numerals indicate like parts in the different views, Figure 1 is a portion of a wheel-felly with a flat metallic tire and side plates and provided with my improved tire, and Fig. 2 a section of the same at the line *x x* of Fig. 1.

Referring to these figures, 1 is the wheel-felly, and 2 the flat metallic tire, on which rests the endless rubber tire 3, provided with longitudinal wires 4, bearing on short cross-wires 5. The tire 3 has a rounded tread and a flat base adapted to rest on the tire 2 and has lateral wings 6, that normally extend outward from the tire, and this tire is constructed endless and vulcanized in that condition, being adapted by slight distention to be placed on the wheel. Excepting as hereinafter noted, this construction does not differ essentially from certain tires now constructed.

The rounded tread portion of the tire 3, hereinbefore referred to, is preferably rounded at the bottom and top corners and of such width as to prevent their entire closure from longitudinal compression of the tire either from heavy load or track obstruction. By this construction all danger of sliding along railway-tracks or other like obstructions is avoided, as the notches 7 will engage the railway-rail, while as the tire is endless there is no weakening from wear between connected ends, and the notches afford spaces for the tire to expand lengthwise into under pressure of a load, and this construction can be used to advantage in a carriage-tire applied in a channel in the usual way by joining the ends.

I claim as my invention—

An improved vehicle-tire consisting of an endless metallic band adapted to inclose and rest on the felly; a rubber band adapted to rest on said metallic band having a tread portion with transverse grooves at intervals in combination with oppositely-disposed annular plates adapted to cover the union of the felly and rubber band, substantially as shown and described.

In testimony that I claim the above I hereunto set my hand in the presence of two subscribing witnesses.

FRANK A. SEIBERLING.

In presence of—
C. P. HUMPHREY,
C. E. HUMPHREY.